US012042938B2

(12) United States Patent
Kupcsik et al.

(10) Patent No.: US 12,042,938 B2
(45) Date of Patent: Jul. 23, 2024

(54) METHOD FOR CONTROLLING A ROBOTIC DEVICE AND ROBOT CONTROL UNIT

(71) Applicant: Robert Bosch GmbH, Stuttgart (DE)

(72) Inventors: Andras Gabor Kupcsik, Boeblingen (DE); Leonel Rozo, Boeblingen (DE); Meng Guo, Renningen (DE); Patrick Kesper, Nufringen (DE); Philipp Christian Schillinger, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 352 days.

(21) Appl. No.: 17/453,240

(22) Filed: Nov. 2, 2021

(65) Prior Publication Data
US 2022/0143831 A1    May 12, 2022

(30) Foreign Application Priority Data

Nov. 12, 2020    (DE) ............... 10 2020 214 231.9

(51) Int. Cl.
*B25J 9/00*    (2006.01)
*B25J 9/16*    (2006.01)

(52) U.S. Cl.
CPC ............ *B25J 9/1664* (2013.01); *B25J 9/163* (2013.01); *G05B 2219/31358* (2013.01); *G05B 2219/39001* (2013.01); *G05B 2219/39298* (2013.01)

(58) Field of Classification Search
CPC .......... B25J 9/1664; B25J 9/163; B25J 13/00; G05B 2219/31358; G05B 2219/39001; G05B 2219/39298
See application file for complete search history.

(56) References Cited

U.S. PATENT DOCUMENTS

2018/0126550 A1    5/2018 Izhikevich et al.
2019/0275671 A1*   9/2019 Natarajan ............ B25J 9/1664
(Continued)

FOREIGN PATENT DOCUMENTS

CN    111872934 A  *  11/2020  ............ B25J 9/161
DE    102013203381 A1    9/2013
(Continued)

OTHER PUBLICATIONS

Schwenkel et al., "Optimizing Sequences of Probabilistic Manipulation Skills Learned From Demonstration," 3RD Conference on Robot Learning (CORL 2019), Osaka, Japan, 2019, pp. 1-10.

*Primary Examiner* — Jonathan L Sample
*Assistant Examiner* — Shaheda Shabnam Hoque
(74) *Attorney, Agent, or Firm* — NORTON ROSE FULBRIGHT US LLP; Gerard A. Messina

(57) ABSTRACT

A method for controlling a robotic device, in which a composite robot trajectory model made up of robot trajectory models of the movement skills is generated for a sequence plan for a task to be carried out by the robot including a sequence of movement skills and primitive actions to be carried out, and the robot is controlled, if after one movement skill according to the sequence plan one or multiple primitive action(s) is/are to be executed before the next movement skill, by interrupting the control of the robot according to the composite robot trajectory model after carrying out the movement skill, and by executing the one or multiple primitive action(s) and then resuming the control of the robot according to the composite robot trajectory model.

8 Claims, 5 Drawing Sheets

(56) References Cited

U.S. PATENT DOCUMENTS

2020/0398427 A1\* 12/2020 Kupcsik .................. B25J 9/163
2021/0125052 A1\* 4/2021 Tremblay ............... G06N 3/084

FOREIGN PATENT DOCUMENTS

| | | |
|---|---|---|
| DE | 102014108287 A1 | 11/2015 |
| DE | 202017105598 U1 | 5/2018 |
| DE | 102019203214 A1 | 9/2020 |
| DE | 102019216229 A1 | 4/2021 |
| DE | 102019216560 A1 | 4/2021 |
| WO | WO-2018053187 A1 \* | 3/2018 .............. B25J 9/161 |
| WO | WO-2021214636 A1 \* | 10/2021 ............ B25J 9/1661 |

\* cited by examiner

METHOD FOR CONTROLLING A ROBOTIC DEVICE AND ROBOT CONTROL UNIT

CROSS REFERENCE

The present application claims the benefit under 35 U.S.C. § 119 of German Patent Application No. DE 102020214231.9 filed on Nov. 12, 2020, which is expressly incorporated herein by reference in its entirety.

FIELD

The present description relates to a method for controlling a robotic device and to robot control units.

BACKGROUND INFORMATION

To carry out a task by a robot, a user typically specifies a sequence plan, which may include the execution of various actions. Some of these actions may be primitive actions provided by the robot, which do not have to be adapted to the control situation, such as "open gripper." Actions may, however, also be movement skills of a type, in which it is desirable for the robot to be able to adapt to the respective control situation. Thus, for example, the action "pick up the object" is a function of the initial position and of the initial orientation of the object.

For such skills, it is possible to train robot trajectory models. For example, a method is described in L. Schwenkel, M. Guo, and M. Bürger, "Optimizing sequences of probabilistic manipulation skills learned from demonstration," in Conference on Robot Learning, 2019, (which is identified below as reference [1]), with the aid of which each movement skill is trained separately under various scenarios and is not bound to any specific task.

Approaches for controlling a robot (or, in general, a robotic device) are desirable, which enable an efficient implementation of a sequence plan, of both primitive actions as well as movement skills for which robot trajectory models have been learned.

SUMMARY

According to various specific example embodiments of the present invention, a method is provided for controlling a robotic device, including providing demonstrations for carrying out each of multiple movement skills, training a robot trajectory model for each movement skill from the demonstrations, receiving a sequence plan for a task to be carried out by the robotic device, the sequence plan including a sequence to be carried out from the movement skills and primitive actions, ascertaining a reduced sequence plan from the sequence plan by omitting the primitive actions, generating a composite robot trajectory model from the robot trajectory models of the movement skills for the reduced sequence plan if two movement skills according to the reduced sequence plan are to be carried out in succession, cascading the robot trajectory models of the movement skills and controlling the robot according to the composite robot trajectory model, the control of the robot according to the composite robot trajectory model being interrupted after the movement skill is carried out and the one or multiple primitive actions being executed and the control of the robot according to the composite robot trajectory model being resumed, if after a movement skill according to the sequence plan one or multiple primitive actions is/are to be carried out before the next movement skill.

According to one further specific embodiment of the present invention, a robot control unit is provided, which is configured to carry out the above described method.

The method for controlling a robotic device and the robot control unit described above enables an efficient control of a robotic device for a task, for which the robotic device is intended to carry out movement skills learned from demonstrations as well as primitive actions. It is possible, in particular, to control the robotic device according to a composite robot trajectory model, even if the movement skills, of the learned robot trajectory models of which the composite robot trajectory model is made up, are interrupted by primitive actions.

Various exemplary embodiments are provided below.

Exemplary embodiment 1 is a method for controlling a robotic device as described above.

Exemplary embodiment 2 is a method according to exemplary embodiment 1, a state in the composite robot trajectory model, which is an end state of the robot trajectory model of the movement skill being identified, if according to the sequence plan one or multiple primitive actions is/are to be carried out after a movement skill, the control of the robot according to the composite robot trajectory model being interrupted if the state in the composite robot trajectory model during controlling of the robot has been reached, the one or multiple primitive action(s) being carried out and the control of the robot according to the composite robot trajectory model then being resumed.

The inclusion of the primitive actions based on the end states of the robot trajectory models of the various movement skills ensures that the primitive actions are carried out at the correct time in the control sequence. The characteristic of the primitive actions to not change the position of the robot also ensures that the subsequent movement skills according to the composite robot trajectory model are able to be executed.

Exemplary embodiment 3 is a method according to exemplary embodiment 1 or 2, there being for each movement skill of the robot trajectory model a hidden semi-Markov model including one or multiple initial state(s) and one or multiple end state(s), the method further including the training of a pre-condition model for each movement skill from the demonstrations, which includes for each initial state of the robot trajectory model of the movement skill a probability distribution of robot configurations before the execution of the movement skill, and of an end condition model for each movement skill, which includes for each end state of the robot trajectory model of the movement skill a probability distribution of robot configurations after the execution of the movement skill and the composite robot trajectory model being generated by cascading the robot trajectory models of the movement skills if two movement skills according to the reduced sequence plan are to be carried out in one sequence, by incorporating the states of the trajectory models of the two movement skills into the composite robot trajectory model and calculating a transition probability between each end state of the trajectory model of the first movement skill of the two movement skills and each initial state of the trajectory model of the second movement skill of the two movement skills as a function of the similarity between the probability distribution of the end condition model of the first movement skill for the first state of the first movement skill and the probability distribution of the initial model of the second movement skill for the initial state for the second movement skill.

if two movement skills according to the sequence plan are to be carried out alternatively to one another, combining the robot trajectory models of the movement skills by
incorporating the states of the trajectory models of the two movement skills into the composite robot trajectory model and
setting the transition probability between states of the first movement skill and states of the second movement skill to zero.

This enables an automatic correct composition of robot trajectory models of the movement skills.

Exemplary embodiment 4 is the method according to exemplary embodiment 1, each movement skill including a manipulation of one or more of multiple object(s) by the robot and the hidden semi-Markov model of each movement skill being a task-parameterized hidden semi-Markov model including task parameters that correspond to a robot configuration and object configuration, in which the movement skill is applied.

Thus, various specific embodiments enable an efficient training and an efficient control of a robotic device for handling one or multiple object(s).

Exemplary embodiment 5 is the method according to exemplary embodiment 4, which further includes the training of an effect model for each movement skill, which includes for each end state of the robot trajectory model of the movement skill a probability distribution of how the robot configuration and/or object configuration is/are changed after the execution of the movement skill relative to an initial robot configuration and/or object configuration, to which the movement skill is applied, if two movement skills are to be carried out in a sequence in the task, the cascading of the robot trajectory model of the movement skill including the transformation of the task-parameterized hidden semi-Markov model of the second movement skill, so that its task parameters are task parameters that correspond to the robot configuration and/or object configuration, which is/are provided by the effect model of the first movement skill.

Thus, it may be ensured that a control trajectory over a sequence of movement skills is correctly calculated.

Exemplary embodiment 6 is the method according to one of exemplary embodiments 1 through 5, the generation of the composite robot trajectory model including the repeated cascading of robot trajectory models, cascaded robot trajectory models and combined robot trajectory models and the combining of robot trajectory models, cascaded robot trajectory models and a combined robot trajectory according to the task, so that the composite robot trajectory model is a trajectory model for the entire task.

As a result, a composite model for a complex task may be iteratively determined, which ensures robustness for a complex task and frees an operator from the need to define a complex hierarchy of branching conditions.

Exemplary embodiment 7 is a robot control unit, which is configured to carry out the method according to one of exemplary embodiments 1 through 6.

Exemplary embodiment 8 is a computer program including commands which, when they are executed by a processor, cause the processor to carry out a method according to exemplary embodiments 1 through 6.

Exemplary embodiment 9 is a computer-readable medium, which stores commands which, when they are executed by a processor, cause the processor to carry out a method as recited in one of exemplary embodiments 1 through 6.

BRIEF DESCRIPTION OF THE DRAWINGS

In the figures, similar reference numerals relate in general to the same parts in all the different views. The figures are not necessarily true to scale, the emphasis instead being placed in general on the representation of the features of the present invention. Various aspects of the present invention are described in the following description with reference to the figures.

DETAILED DESCRIPTION OF EXAMPLE EMBODIMENTS

The following detailed description refers to the accompanying drawings, which show for the purpose of explanation specific details and aspects of this description, in which the present invention may be carried out. Other aspects may be used and structural, logical and electrical changes may be carried out without departing from the scope of protection of the present invention. The various aspects of this description are not necessary mutually exclusive, since several aspects of this description may be combined with one or multiple other aspect(s) of this description in order to form new aspects.

Various examples are described in greater detail below.

Figure 1:
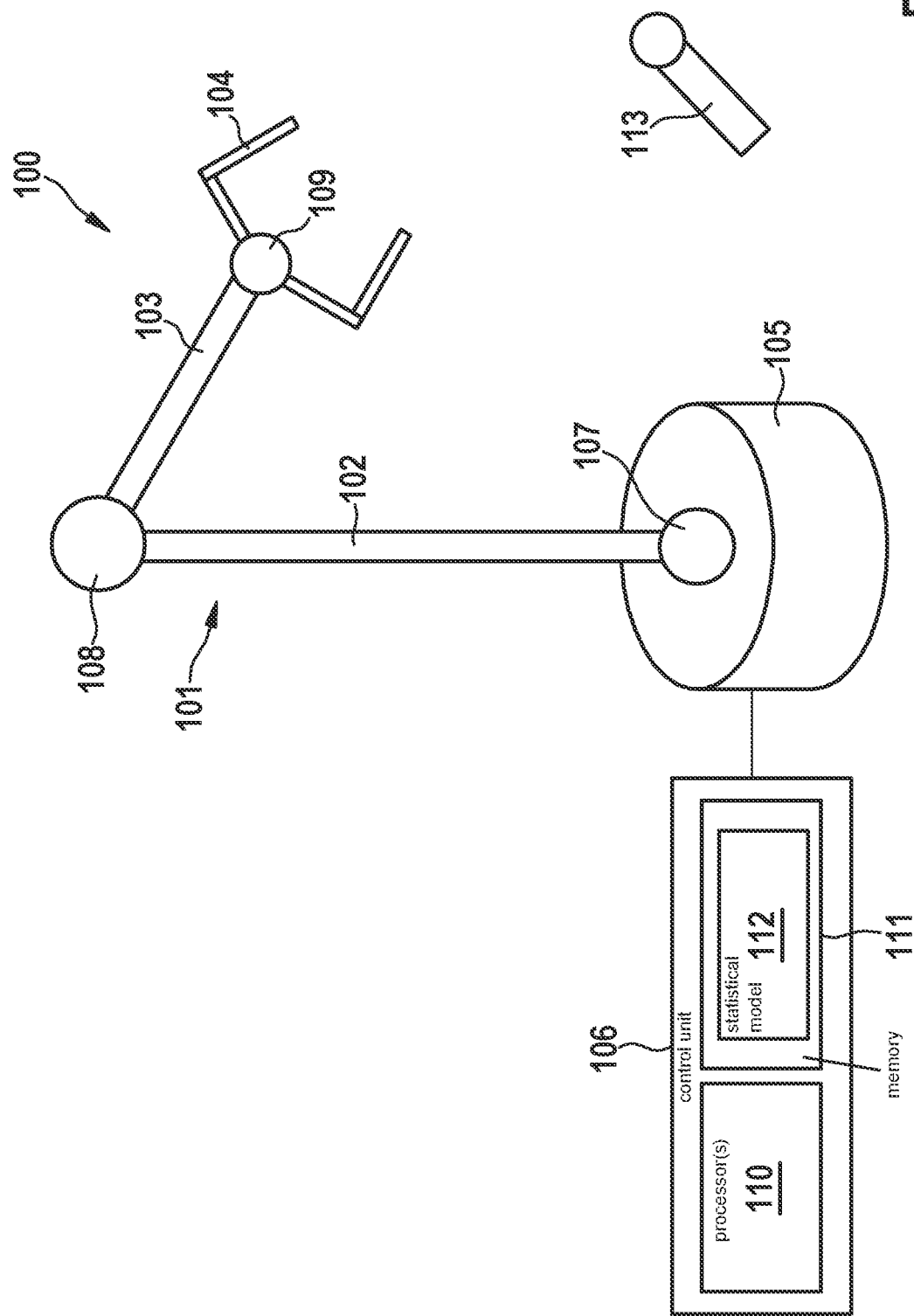
FIG. 1 shows a robot, in accordance with an example embodiment of the present invention.

FIG. 1 shows a robot 100.

Robot 100 includes a robotic arm 101, for example, an industrial robotic arm for handling or mounting a workpiece (or one or multiple other object(s)). Robotic arm 101 includes manipulators 102, 103, 104 and a base (or support) 105, by which manipulators 102, 103, 104 are supported. The term "manipulator" refers to the moving elements of robotic arm 101, whose actuation allows for a physical interaction with the surroundings, for example, in order to carry out a task. For controlling, robot 100 includes a (robotic) control unit 106, which is configured to implement the interaction with the surroundings according to a control program. Final element 104 (furthest away from support 105) of manipulators 102, 103, 104 is also referred to as end effector 104 and may include one or multiple tool(s) such as, for example, a welding torch, a gripping tool, a painting tool or the like.

The other manipulators 102, 103 (closer to support 105) may form a positioning device, so that together with end effector 104, robotic arm 101 including end effector 104 at its end is provided. Robotic arm 101 is a mechanical arm, which is able to perform functions similar to a human arm (possibly with a tool at its end).

Robotic arm 101 may include articulated elements, 107, 108, 109, which connect manipulators 102, 103, 104 to one another and to support 105. An articulated element 107, 108, 109 may include one or multiple articulated joint(s), each of which is able to provide a rotational movement (i.e., rotation) and/or a translational movement (i.e., a displacement) of associated manipulators relative to one another. The movement of manipulators 102, 103, 104 may be initiated with the aid of actuators that are controlled by control unit 106.

The term "actuator" may be understood to be a component, which is designed, in response to being driven, for influencing a mechanism or process. The actuator is able to convert instructions output by control device 106 (the so-called activation) into mechanical movements. The actuator, for example, an electromechanical converter, may be configured to convert electrical energy into mechanical energy in response to its activation.

The term "control unit" may be understood to be any type of logic that implements an entity, which may, for example, include a circuit and/or a processor, which is able to execute software stored in a memory medium, firmware or a combination thereof, and which may output the instructions, for example, to an actuator in the present example. The control unit may, for example, be configured to control the operation of a robotic device by using program code (for example, software).

In the present example, control unit 106 includes one or multiple processor(s) 110 and a memory 111, which stores code and data, on the basis of which processor 110 controls robotic arm 101. According to various specific embodiments, control unit 106 controls robotic device 101 on the basis of a statistical model 112 stored in memory 111. Robot 100 is intended, for example, to manipulate object 113.

At any point in time, the entire system made up of robotic arm 101 and object 113 (or also further objects) to be manipulated is in a particular state with respect to position, orientation, end effector state (gripper open/closed) etc. This state of the system, of the robot or of an object is referred to below as (system/robot/object)-configuration, in order to avoid confusion with the states of the statistical model, which are passed through during controlling.

A robot 100 may utilize methods of learning from demonstration (LfD) in order to learn to carry out a task or to cooperate with a human partner. Human demonstrations may be coded by a probabilistic model 112 (also referred to as a statistical model), which represents the nominal plan of the task for the robot. Control unit 106 may subsequently use statistical model 112, which is also referred to as a robot trajectory model, in order to generate desired robotic movements, potentially as a function of the configuration of both the human partner as well as the surroundings.

The basic idea of LfD is to adapt a prescribed movement skill model such as, for example, GMMs to a set of demonstrations. M demonstrations should be present, of which each $T_m$ contains data points for a data set of $N=\Sigma_m T_m$ total observations $\xi=\{\xi_t\}_{t=1}^N$, wherein $\xi_t \in \mathbb{R}^d$. It is assumed that the same demonstrations are recorded from the perspective of P different coordinate systems (provided by the task parameters such as, for example, local coordinate systems or reference frameworks of objects of interest). One usual way of obtaining such data is to transform the demonstrations from a static global reference framework to a reference framework p by $\xi_t^{(p)}=A^{(p)-1}(\xi_t-b^{(p)})$. Here, $\{(b^{(p)},A^{(p)})\}_{p=1}^P$ is the translation and rotation of (local) reference framework p with respect to a global coordinate system (i.e., the global reference framework). A TP-GMM is then described by model parameters $\{\pi_k,\{\mu_k^{(p)},\Sigma_k^{(p)}\}_{p=1}^P\}_{k=1}^K$, K representing the number of Gaussian components in the mixed model, $\pi_k$ being the previous probability of each component and $\{\mu_k^{(p)},\Sigma_k^{(p)}\}_{p=1}^P$ being the parameters of the k-th Gaussian component within reference framework p.

In contrast to the standard GMM, the above mixed model is not able to be learned separately for each reference framework. In fact, the mixed coefficients $\pi_k$ of all reference frameworks are divided and the k-th component in reference framework p must be mapped onto the corresponding k-th component in the global reference framework. Expectation maximization (EM) is an established method for learning such models.

Once it is learned, the TP-GMM may be used during the execution in order to reproduce a trajectory for the learned movement skill. Given observed reference frameworks $\{b^{(p)},A^{(p)}\}_{p=1}^P$, the learned TP-GMM is namely converted into a single GMM including parameters $\{\pi_k,(\hat{\mu}_k,\hat{\Sigma}_k)\}_{k=1}^K$ by multiplying the affinely transformed Gaussian components across various reference frameworks, as follows $$\hat{\Sigma}_k = \left[\sum_{p=1}^P (\hat{\Sigma}_k^{(p)})^{-1}\right]^{-1}, \hat{\mu}_k = \hat{\Sigma}_k \left[\sum_{p=1}^P (\hat{\Sigma}_k^{(p)})^{-1} \hat{\mu}_k^{(p)}\right], \quad (1)$$

the parameters of the updated Gaussian bell at each reference framework p being calculated as
$\hat{\mu}_k^{(p)}=A^{(p)}\mu_k^{(p)}+b^{(p)}$ and $\hat{\Sigma}_k^{(p)}=A^{(p)}\Sigma_k^{(p)}A^{(p)T}$. Although the task parameters may vary over time, the time index is omitted due to the notation.

Hidden semi-Markov models (HSMMs) expand hidden standard Markov models (HMMs) by embedding pieces of time information of the underlying stochastic process. This means that whereas in HMM the underlying hidden process is assumed to be Markov, i.e., the probability of the transition to the next state is only a function of the instantaneous state, in HSMM, the state process is assumed to be semi-Markov. This means that a transition to the next state is a function of the instantaneous state as well as of the elapsed time since the state has been entered. They may be applied in combination with TP-GMMs for robot movement skills coding in order to learn spatial-temporal features of the demonstration. A task-parameterized HSMM model (TP-HSMM model) is defined as:

$$\Theta = \left\{\{a_{hk}\}_{h=1}^K, (\mu_k^D, \sigma_k^D), \pi_k, \{(\mu_k^{(p)}, \Sigma_k^{(p)})\}_{p=1}^P\right\}_{k=1}^K,$$

$a_{hk}$ being the transition probability from state h to k; $(\mu_k^D, \sigma_k^D))$ describing the Gaussian distributions for the duration of state k, i.e., the probability that state k is retained for a particular number of successive steps; $\{\pi_k,\{\mu_k^{(p)},\Sigma_k^{(p)}\}_{p=1}^P\}_{k=1}^K$ being the same as previously introduced TP-GMM, which represents the observation probability that corresponds to state k. It should be noted here that the number of states represents the number of Gaussian components in the "connected" TP-GMM.

Given a particular (partial) sequence of observed data points $\{\xi_\ell\}_{\ell=1}^t$, it is to be assumed that the associated sequence of states in $\Theta$ is provided by $s_t = s_1 s_2 \ldots s_t$. The probability that data point $\xi_t$ belongs to state k (i.e., $s_t = k$) is provided by forward variable $\alpha_t(k) = p(s_t = k, \{\xi_\ell\}_{\ell=1}^t)$:

$$\alpha_t(k) = \sum_{\tau=1}^{t-1} \sum_{h=1}^{K} \alpha_{t-\tau}(h) a_{hk} \mathcal{N}(\tau | \mu_k^D, \sigma_k^D) o_\tau^t, \quad (2)$$

$o_\tau^t = \prod_{\ell=t-\tau+1}^{t} \mathcal{N}\xi_\ell | \hat{\mu}_k, \hat{\Sigma}_k)$ being the emission probability and $(\hat{\mu}_k, \hat{\Sigma}_k)$ of (1) being derived given the task parameters. Furthermore, the same forward variable may also be used during the reproduction in order to predict future steps up to $T_m$.

Since, however, in this case future observations are not available, only pieces of transition information and duration information are used, i.e. by setting $\mathcal{N}\xi_\ell | \hat{\mu}_k, \hat{\Sigma}_k) = 1$ for all k and $\ell > t$ in (2). Finally, the sequence of the most probable states $s^*_{T_m} = s^*_1 s^*_2 \ldots s^*_{T_m}$ is determined by selecting $s^*_t = \arg\max_k \alpha_t(k), \forall 1 \leq t \leq T_m$.

A desired final observation of the robot state should now be provided as $\xi_T$, T being the movement skill time horizon (for example, the average length over the demonstrations). Furthermore, the initial robot state is observed as $\xi_1$. To execute the movement skill (i.e., the movement skill reproduction) given learned model $\Theta_a$, only the most probable state sequence $s^*_T$ is constructed given only $\xi_1$ and $\xi_T$.

The reproduction using the forward variable may not directly take place in this case, since the forward variable in equation (2) calculates the sequence of marginally most probable states, whereas what is desired is the commonly most probable sequence of states given $\xi_1$ and $\xi_T$. As a result, if (2) is used, there is no guarantee that the returned sequence $s^*_T$ corresponds to both the spatial-temporal patterns of the demonstrations as well as to the final observation. With respect to one example for picking up an object, it may return a most probable sequence, which corresponds to "pick up from the side," even if the desired end configuration is that the end effector is located at the upper side of the object.

To overcome this problem, a modification of the Viterbi algorithm is used according to one specific embodiment. The classic Viterbi algorithm may be used in order to find the most probable sequence of states (also referred to as Viterbi path) in HMMs, which result in a given flow of observed events. According to one specific embodiment, a method is used, which differs from the former in two main aspects: (a) it operates on HSMM instead of HMM; and more significantly (b) most observations aside from the first and the last are lacking. In the absence of observations, the Viterbi algorithm becomes, in particular, $$\delta_t(j) = \max_{d \in \mathcal{D}} \max_{i \neq j} \delta_{t-d}(i) a_{ij} p_j(d) \prod_{t'=t-d+1}^{t} \tilde{b}_j(\xi_{t'}), \quad (3)$$

$$\delta_1(j) = b_j(\xi_1) \pi_j p_j(1),$$

$p_j(d) = \mathcal{N}(d | \mu_j^D, \sigma_j^D)$ being the duration probability of state j, $\delta_t(j)$ being the probability that the system is in state j at time t and not in state j with t+1; and $$\tilde{b}_j(\xi_{t'}) = \begin{cases} \mathcal{N}(\xi_{t'} | \hat{\mu}_j, \hat{\Sigma}_j), & t = 1 \vee t = T; \\ 1, & 1 < t < T. \end{cases}$$

$(\hat{\mu}_j, \hat{\Sigma}_j)$ being global Gaussian component j in $\Theta_a$ of (1) given $\xi_t$. At any time t and for each state j, the two arguments, which maximize equation $\delta_t(j)$ are namely recorded and a simple backtracking procedure is used in order to find most probable state sequence $s^*_T$. In other words, the above algorithm derives the most probable sequence $s^*_T$ for movement skill a, which results in final observation $\xi_T$ starting from $\xi_1$.

If the robot task space is represented by temporally varying locations (including position and orientation) of the end effector, classic euclidic-based methods are unsuitable for processing such data. Thus, according to various specific embodiments, the robot task space is furnished with a Riemannian manifold $\mathcal{M}$. For each point x, there exists in manifold $\mathcal{M}$ a tangent space $\mathcal{T}_x \mathcal{M}$. This enables euclidic operations to be carried out locally while they are geometrically consistent with manifold restrictions.

The exponential mapping and the logarithmic mapping may be used in order to map points between $\mathcal{T}_x \mathcal{M}$ and $\mathcal{M}$. Exponential mapping $\text{Exp}_x : \mathcal{T}_x \mathcal{M} \to \mathcal{M}$ maps a point in the tangent space of point x onto a point on the manifold, while the geodesic distance is maintained. The inverse operation is referred to as logarithmic mapping $\text{Log}_x : \mathcal{M} \to \mathcal{T}_x \mathcal{M}$. Another useful operation is the parallel transport $$\mathcal{A}_{\underset{x}{\parallel} y} : \mathcal{T}_x \mathcal{M} \to \mathcal{T}_y \mathcal{M},$$

which moves elements between tangent spaces without introducing a distortion. The exact form of the above-mentioned operations is a function of the Riemannian metric that is assigned to the manifold. According to various specific embodiments, Riemannian manifolds are used in order to correctly calculate statistics about $\mathcal{M}$ using Riemannian normal distributions, which code the observed movement patterns and retrieve the control actions corresponding to the task schedule (for example, sequenced movement skills) using an optimal Riemannian control unit.

For the following explanations, a robotic arm 101 having multiple degrees of freedom is considered as an example, whose end effector 104 includes a state $x_e \in \mathbb{R}^3 \times \mathcal{S}^3 \times \mathbb{R}^1$ (which describes the Cartesian position, the orientation quaternion and the gripper configuration), which operates within a static and known operating space. There are also objects of interest within the range of arm 101, which are identified with $O = \{o_1, o_2, \ldots, o_J\}$, each of which includes a configuration $x_{o_j} \in \mathbb{R}^3 \times \mathcal{S}^3$. For the sake of simplicity, the entire system configuration is identified with $x = \{x_e, \{x_{o_j}, \forall o_j \in O\}\}$.

In such a scenario, a human user carries out multiple kinesthetic demonstrations on the arm in order to manipulate one or multiple object(s) according to particular movement skills.

The set of demonstrated movement skills is to be identified with $A = \{a_1, a_2, \ldots, a_H\}$. Furthermore, for the movement skill $a \in A$, the set of objects that is involved is indicated by $O_a$ and the set of available demonstrations is identified with $D_a$. It should be noted that all demonstrations follow the structure fixed on objects, which has been introduced above, i.e., they are recorded for multiple reference frameworks (i.e., from the perspective of multiple reference frameworks), which are normally assigned to the objects in $O_a$, which frequently represent the object position in the operating space. The movement skill "insert the pin into the cylinder" includes, for example, the objects "pin" and "cylinder" and the associated demonstrations are recorded both from the robot reference framework, the "pin" reference framework as well as the "cylinder" reference framework.

The (manipulation) task, which is considered below, is made up of a sequence of movement skills a*, which are selected from the demonstrated movement skills A. An insertion task, for example, entails "picking up the cap, reorienting the cap, picking up the cap again and inserting the cap." At the end of the task, a target configuration G is achieved as the desired end configuration of the system, including the robot and the objects.

The usual way to organize manipulation tasks in the factory is via a diagram or a sequence plan. They are usually defined by drawing and storing in a GUI (graphic user interface).

Figure 2:
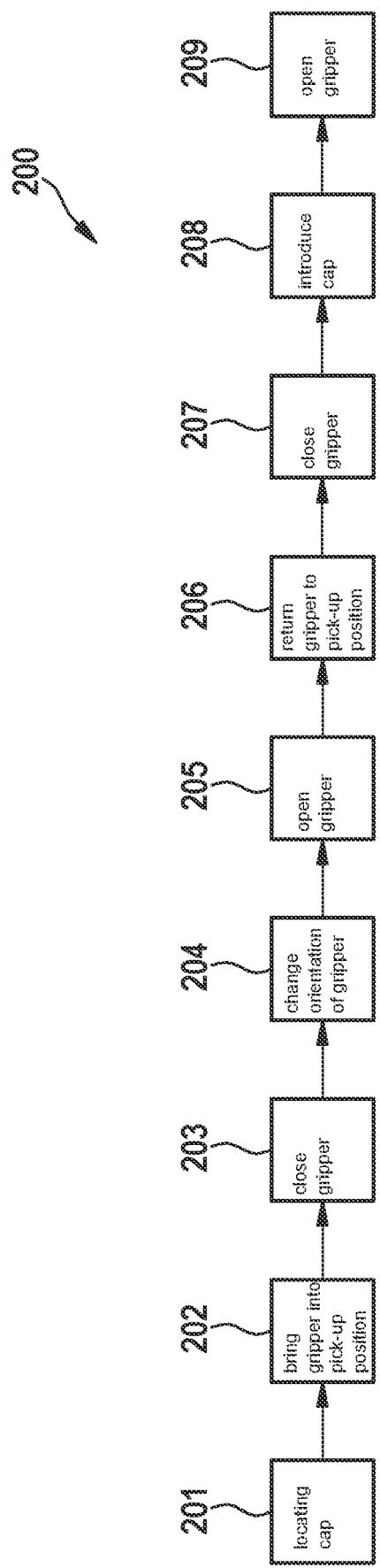
FIG. 2 shows a flowchart, which represents a manipulation task including movement skills in a sequence, in accordance with an example embodiment of the present invention.

FIG. 2 shows a flowchart (or task diagram) 200, which represents a manipulation task including movement skills in a sequence.

The manipulation task is made up of a sequence of movement skills 201 through 209, each skill being either a movement skill a∈A learned from demonstrations as described above, i.e., being a movement skill, for which an HSMM has been learned, or a predefined primitive action (for example, a gripper command). For example, the manipulation task is a task for inserting a cap and includes
  locating cap (primitive action) 201
  bringing gripper into pick-up position (movement skill) 202
  closing gripper (primitive action) 203
  changing orientation of the gripper (and thus the cap) (movement skill) 204
  opening gripper (primitive action) 205
  returning gripper to pick-up position (movement skill) 206
  closing gripper (primitive action) 207
  introducing cap (movement skill) 208
  opening gripper (primitive action) 209

The actions close gripper 203, 207, open gripper 205, 209 and locate cap 201 are predefined primitive actions, which entail for example 6D pose estimations (locate cap 201) whereas the other actions are learned movement skills which, like above-described models, are learned from demonstrations.

The sequence plan may also include branchings. For example, movement skills "bring gripper into position from above to pick up an object," "bring gripper into position from the left to pick up objects" or "bring gripper into position from the right to pick up objects" may be executed as a function of the initial configuration of the object. In this context, the sequence plan may indicate multiple sequences of movement skills and primitive actions to be carried out, which result from the various branchings (and thus from which branching conditions the respective control situation meets).

This means that the robot may have a set of movement skills (pre-programmed primitive actions or movement skills learned via demonstrations) pre-installed, and for a specific manipulation task, the operator manually constructs a diagram that describes the implementation of this task (for example, as in FIG. 2), the components being the set of learned movement skills and the primitive actions.

Figure 3:
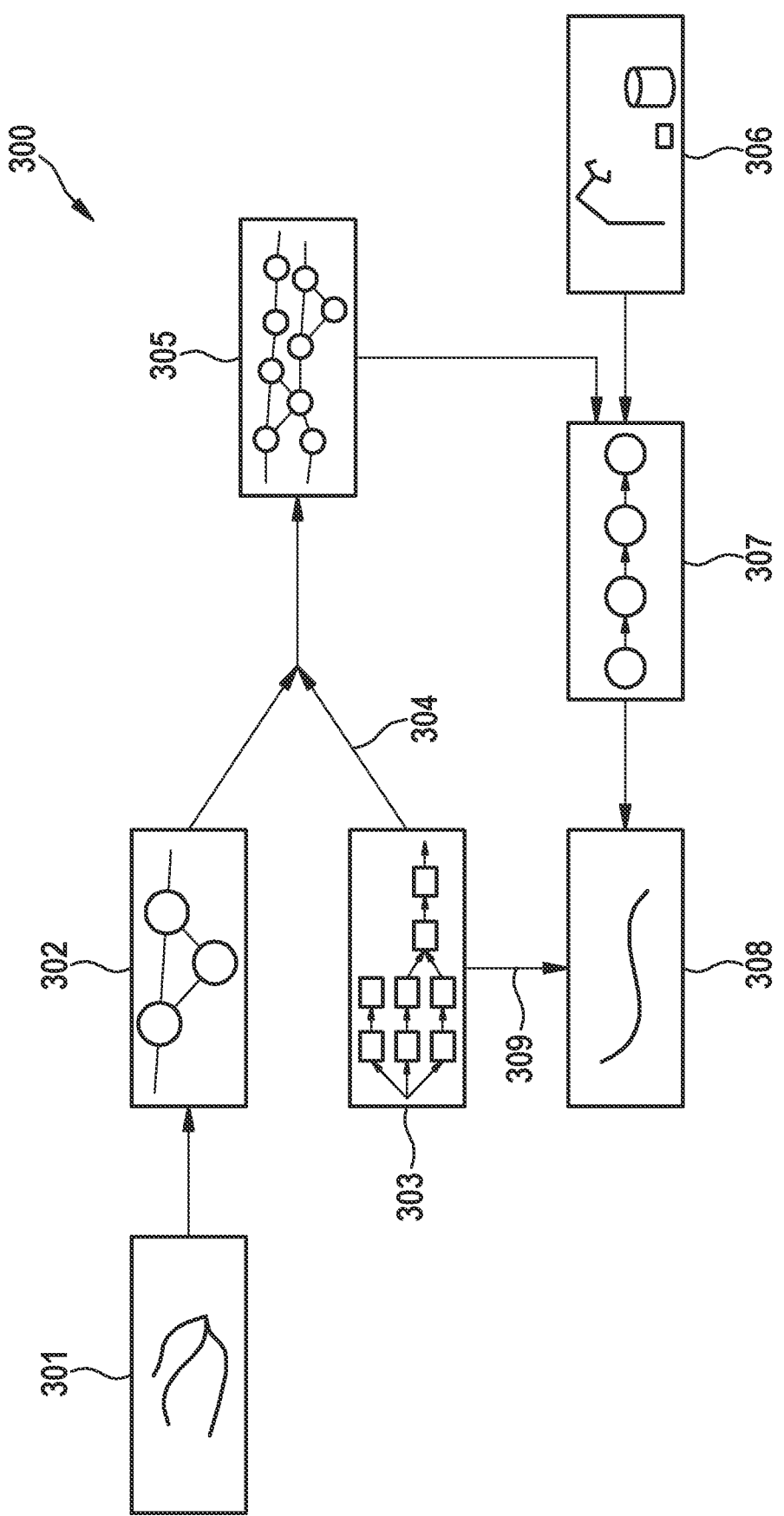
FIG. 3 shows a flowchart, which represents a method for controlling a robotic device according to one specific embodiment of the present invention.

FIG. 3 shows a flowchart, which represents a method for controlling a robotic device according to one specific embodiment.

Demonstrations of movement skills are carried out at 301.

The movement skills include at least those movement skills that are necessary for executing a task, which is provided by a sequence plan 303. Sequence plan 303, as described above with reference to FIG. 2, also includes primitive actions in addition to the movement skills.

For a demonstrated movement skill a∈A as described above, the set of available demonstrations is provided by $D_a = \{\xi_{s,t}\}_{t=1}^N$, which are recorded in P reference framework. It should be noted that such reference frameworks are bound directly to the objects in $O_a$.

At 302, a robot trajectory model (also referred to as "robot behavior model") is learned for each movement skill.

As described above, given a correctly selected number of components K, for example, TP-HSMM model $\Theta_a$, which abstracts the spatial-temporal features of trajectories with respect to a movement skill a, may be learned using an algorithm of the EM type (expectation maximization).

In 304, a composite robot trajectory model is generated from the learned robot trajectory models learned in 302.

For this purpose, the movement skills (without the primitive actions) are drawn from the sequence plan in 304. In the example of FIG. 2, this means that a composite robot trajectory model is generated for the sequence of movement skills
  bring gripper into pick-up position 202
  change orientation of the gripper 204
  return gripper into pick-up position 206
  introduce cap (movement skill) 208

To be able to generate a composite robot trajectory model from the trajectory models of the various movement skills, the learning for each movement skill encompasses, in addition to the learning of the trajectory model, further the learning of a precondition model, of an end condition model and of an effect model. Using this model, a composite robot trajectory model 305 is constructed for the movement part (i.e., the sequence of the movement skills without the primitive actions) of the task established by sequence plan 303. Descriptively speaking, the precondition model encapsulates how the system should be before the execution of the movement skill, whereas the effect model and the end condition model encapsulate how the system should be changed after the execution of the movement skill. These models are an important part for calculating the composite robot trajectory model, since they measure the compatibility between movement skills and track the development of the system configuration (i.e., the configuration of the robot and of the objects involved). It should be noted that the term "movement skill model" may be understood in such a way that it includes the robot trajectory model, the precondition model, the end condition model and the effect model for the respective movement skill.

As described with reference to FIG. 2, a task may include the execution of movement skills in branches (i.e., as alternatives) and in a sequence.

Consequently, the generation of the composite model includes the recursive application of combination operations for combining movement skills in the sequence and of an operation for combining in parallel the movement skills.

Figure 4:
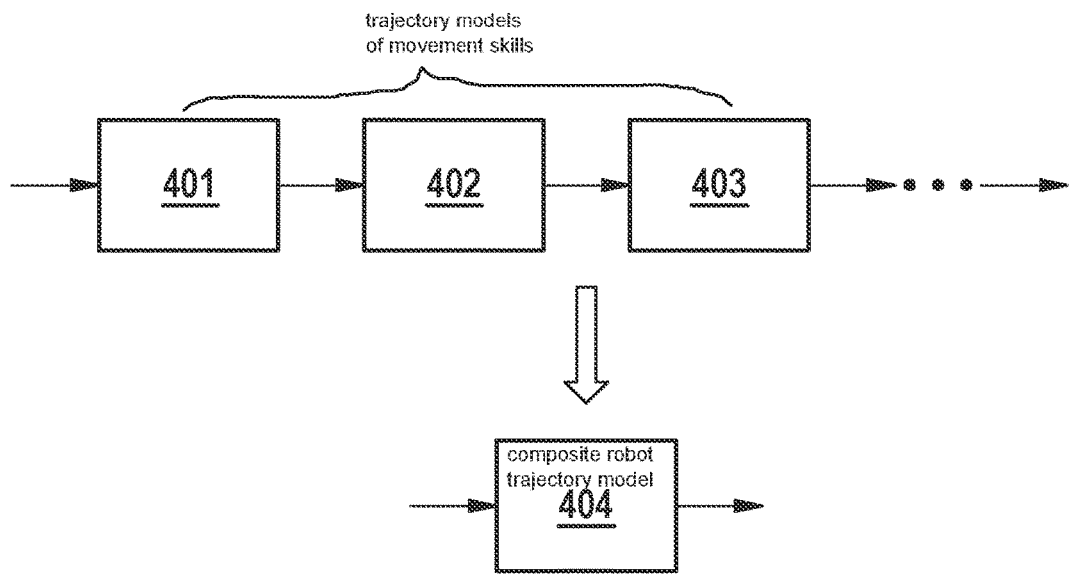
FIG. 4 shows a cascading operation for cascading robot trajectory models of movement skills, which are to be executed in a sequence, to form a composite robot trajectory model, in accordance with an example embodiment of the present invention.

FIG. 4 represents a cascading operation for cascading robot trajectory models of movement skills 401, 402, 403, which are to be executed in a sequence to form a composite robot trajectory model 404.

Figure 5:
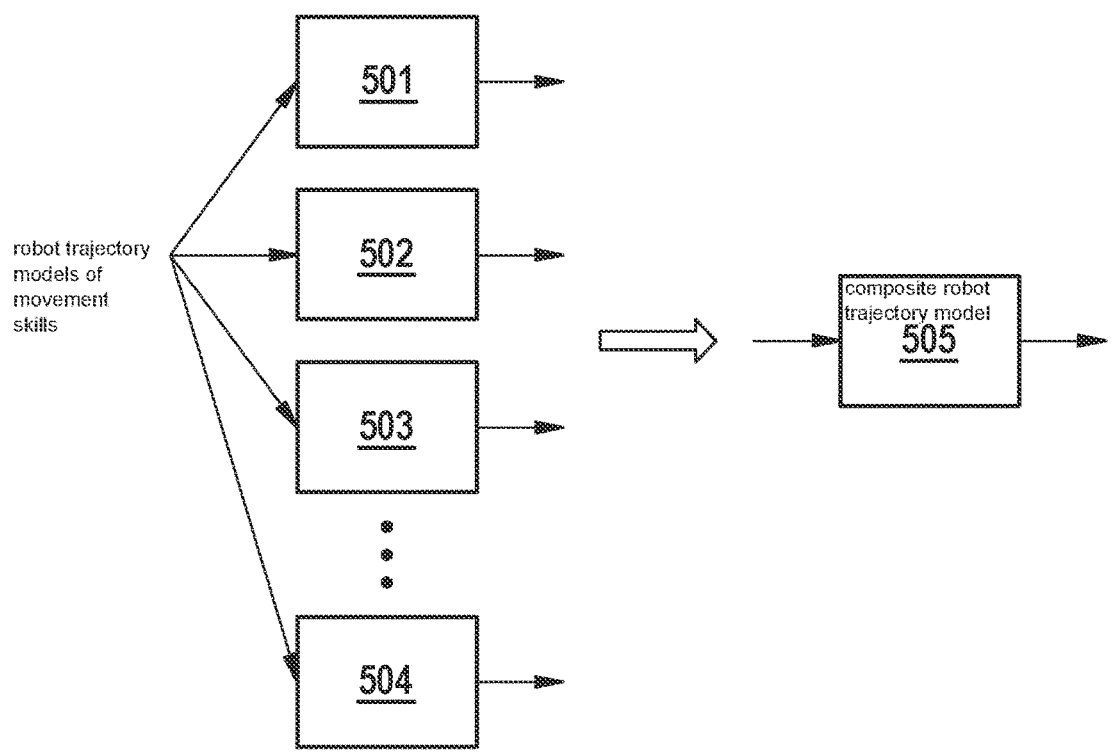
FIG. 5 shows a combination operation for combining robot trajectory models of movement skills, which are to be executed in branches (i.e., alternatively) to form a composite robot trajectory model, in accordance with an example embodiment of the present invention.

FIG. 5 represents a combination operation for combining robot trajectory models of movement skills 501, 502, 503, 504, which are to be executed in branches (i.e., alternatively) to form a composite robot trajectory model 505.

The combination operation for cascading a sequence of movement skills, as represented in FIG. 4, includes one or multiple application(s) of an operation for cascading two movement skills that are to be executed in a sequence. A combination operation for combining a sequence of movement skills as represented in FIG. 5 also includes one or multiple application(s) of an operation for combining two movement skills that are to be executed in branches.

For the combination of two movement skills that are to be executed in a sequence, the trajectory models of the two movement skills are cascaded in the following manner to form a composite trajectory model.

Given two TP-HSMMs $\Theta_{a_1}$ and $\Theta_{a_2}$ of two movement skills in a sequence, the operation for cascading the same to $\hat{\Theta}$ is summarized in algorithm 1.

---
Algorithm 1 Cascading a pair of TP-HSMMs
---
Input: $(\Theta_{a_1}, \Gamma_{a_1})$ and $(\Theta_{a_2}, \Gamma_{a_2})$
Output: $(\hat{\Theta}, \hat{\Gamma})$
1   for all end components $k_f \in \Theta_{a_1}$ carry out
2   |   generate copy of as $\Theta_{a_2}^{k_f}$
3   |   calculate $\{a_{k_f, k_i}\}$ for all initial $k_i \in \Theta_{a_2}^{k_f}$
4   |   update $\Theta_{a_2}^{k_f}$ and $\Gamma_{1T,a_2}^{k_f}$
5   |__ cascade $\Theta_{a_1}$ and $\Theta_{a_2}^{k_f}$. Add $\hat{\Theta}$.
6   set additional parameters of $\hat{\Theta}$.
7   $\hat{\Gamma} = \{\hat{\Gamma}_1, \hat{\Gamma}_T, \hat{\Gamma}_{1T}\} = \{\Gamma_{1,a_1}, \Gamma_{T,a_2}, \Gamma_{1T,a_2}^{k_f}, \forall k_f\}$
---

It should be noted that the calculation and the update of lines 3 and 4 of algorithm 1 may be carried out according to equations (4) and (5), which are provided below.

A key finding may be considered to be that the same model $\Theta_{a_2}$ cascaded as a function of the end components (i.e., HSMM state) of $\Theta_{a_1}$ at with $\Theta_{a_2}$, is updated differently. This is due to the fact that each end component codes different transformations of task parameters $\Theta_{a_1}$ after the execution of $a_1$ which, in turn, results in different ways of updating the components in $\Theta_{a_2}$. As a result, composite model $\hat{\Theta}$ includes variable $K_1 + K_{1,f} \cdot K_2$, $K_1$ and $K_2$ being the number of components of $\Theta_{a_1}$ and $\Theta_{a_2}$, whereas $K_{1,f}$ is the number of end components $\Theta_{a_1}$. Algorithm 2 is made up, in particular, of two main operations: (a) calculating the transition probability of each end component in $\Theta_{a_1}$ to each initial component in $\Theta_{a_2}$; (b) modifying all components of $\Theta_{a_2}$ for each end component $\Theta_{a_1}$, with which $\Theta_{a_2}$ is cascaded.

According to one specific embodiment, a precondition model and an effect model as described in reference [1] are used. The learned precondition model, identified with $\Gamma_{1,a}$, contains, in particular, TP-GMMs for the initial robot configurations (for example, initial position and/or location of the robot), i.e., $\Gamma_{1,a} = \{(\hat{\mu}_1^{(p)}, \hat{\Sigma}_1^{(p)}), \forall p \in P_{1,a}\}$, $P_{1,a}$ being the selected set of task parameters, which are derived from the initial system configuration (i.e., from the initial configuration (for example, position and/or location) of the robot and/or the objects). An end condition model is also introduced here, identified with $\Gamma_{T,a}$, which is learned in a manner similar to $\Gamma_{1,a}$, but for the end configuration, i.e., $\Gamma_{T,a} = \{(\hat{\mu}_T^{(p)}, \hat{\Sigma}_T^{(p)}), \forall p \in P_{T,a}\}$, $P_{T,a}$ being the selected set of reference frameworks derived from the end system configuration. Simply put, $\Gamma_{1,a}$ models the initial configuration before the execution of movement skill a, whereas $\Gamma_{T,a}$ models the end configuration thereafter. The learned effect model, identified with $\Gamma_{1T,a}$, further contains TP-GMMs for the predicted end system configuration, i.e., $\Gamma_{1T,a} = \{\{(\hat{\mu}_{1,o}^{(p)}, \hat{\Sigma}_{1,o}^{(p)}), \forall p \in P_{1,a}\}, \forall o \in O_a \cup e\}$, $P_{1,a}$ being defined in $\Gamma_{1,a}$. These three models differ in that the task parameters for $\Gamma_{T,a}$ are calculated from the end system configuration (after the implementation of a), whereas those for $\Gamma_{1,a}$ and $\Gamma_{1T,a}$ are extracted from the initial system configuration (before the implementation of a). It is written $\Gamma_a \triangleq \{\Gamma_{1,a}, \Gamma_{T,a}, \Gamma_{1T,a}\}$.

The transition probability from an end component $k_f$ of $\Theta_{a_1}$ to an initial component $k_i$ of $\Theta_{a_2}$ is then:

$$a_{k_f, k_i} \propto \exp\left(-\sum_{p \in P_c} KL\left(\Gamma_{T,a_1}^{(p)}(k_f) \| \Gamma_{1,a_2}^{(p)}(k_i)\right)\right), \quad (4)$$

$KL(\bullet \| \bullet)$ being the KL Divergence (Kullback-Leibler-Divergence), $\Gamma_{T,a_1}^{(p)}(k_f)$ being the GMM that is assigned to component $k_f$ for reference framework p, $\Gamma_{1,a_2}^{(p)}(k_i)$ being the GMM that is assigned to component $k_i$ for reference framework p; $P_c = P_{T,a_1} \cap P_{1,a_2}$ being the set of shared reference frameworks that are shared by these two models, which may be forced to not be empty by always adding the global reference framework. This process is repeated for all pairs of end components in $\Theta_{a_1}$ and initial components in $\Theta_{a_2}$. It should be noted that the output probability of any end component $\Theta_{a_1}$ should be normalized.

Given an end component $k_f$ of $\Theta_{a_1}$, each component k of $\Theta_{a_2}$ should be affinely transformed, as follows:

$$(\hat{\mu}_k^{(\hat{p})}, \hat{\Sigma}_k^{(\hat{p})}) \triangleq (\mu_k^{(p)}, \Sigma_k^{(p)}) \otimes (b_{k_f}^{(\hat{p})}, A_{k_f}^{(\hat{p})}), \quad (5)$$

operation $\otimes$ being defined as the same operation of (1); $(b_{k_f}^{(\hat{p})}, A_{k_f}^{(\hat{p})})$ being the task parameter, which is calculated from the mean value of $\Gamma_{1T,a_1}^{(\hat{p}),o}(k_f)$, o being the object assigned to the old reference framework p in $\Theta_{a_1}$, and $\hat{p}$ being the new reference framework in $\Gamma_{1T,a_1}^{o}(k_f)$. It should be noted that the change of reference frameworks is important in order to directly calculate all components of $\Theta_{a_2}$ given an initial system configuration of $\Theta_{a_1}$. The same process is also applied to each component of $\Gamma_{1T,a_2}$ by changing their reference frameworks on the basis of $\Gamma_{1T,a_1}^{o}(k_f)$.

Finally, as indicated in algorithm 1, other model parameters of $\hat{\Theta}$ such as, for example, duration probabilities, initial and end distributions are established in a trivial manner with slight changes of $\Theta_{a_1}$ and $\Theta_{a_2}$. The duration probability of $\Theta_{a_2}$ is duplicated, for example, on $k_f$ multiple copies; initial distributions $\Theta_{a_2}$ are set to zero, since the initial states of $\hat{\Theta}$ correspond to those of first model $\Theta_{a_1}$; end components of $\Theta_{a_1}$ are removed, since the end states of $\hat{\Theta}$ are now the end components of $\Theta_{a_2}$, which are updated to their multiple instances.

For the combination of two movement skills, which are to be executed in parallel, the trajectory models of the two movement skills are combined to form a composite trajectory model as follows.

Two TP-HSMMs $\Theta_{a_1}$ and $\Theta_{a_2}$ of two movement skills are considered in parallel, the operation for combining the same to form $\hat{\Theta}$ is summarized in algorithm 2.

---
Algorithm 2 Parallel composition of a pair of TP-HSMMs
---
Input: $(\Theta_{a_1}, \Gamma_{a_1})$ and $(\Theta_{a_2}, \Gamma_{a_2})$
Output: $(\hat{\Theta}, \hat{\Gamma})$
1   Indicate new all components of $\Theta_2$ by incrementing $K_1$.
/* calculate TPHSMM $\hat{\Theta}$                                          */
2   Copy all components $\Theta_2$ and their duration distributions in $\hat{\Theta}$.
3   Add $\{a_{kh}\}_1$ of $\Theta_1$ and $\{a_{kh}\}_2$ of $\Theta_2$ diagonally to $\{a_{kh}\}$ of $\hat{\Theta}$.
4   Fill other entries in $\{a_{kh}\}$ of $\hat{\Theta}$ with 0.
/* Calculate the precondition and effects TPGMM $\hat{\Gamma}$    */
5   Copy $\Gamma_1$ into $\hat{\Gamma}$.
6   Copy $\Gamma_2$ with the names of the updated components) into $\hat{\Gamma}$.
---

Algorithm 2 is made up of two parts: one part in order to calculate composite TP-HSMM model $\hat{\Theta}$ and another part in order to calculate composite TPGMM model $\hat{\Gamma}$. The first and most important step is to update component indices of $\Theta_2$ by the total number of components in $\Theta_1$. This is to avoid multiple components of various movement skills including the same index. Subsequently, all of the associated TPGMM model, duration model, precondition model and effect model must be updated accordingly. Last but not least, when the composite transition matrix $\{a_{kh}\}$ is calculated, $\{a_{kh}\}_1$ of $\Theta_1$ and $\{a_{kh}\}_2$ of $\Theta_2$ are diagonally added to $\{a_{kh}\}$, whereas the remaining entries are filled with zero. This means that no additional transitions of $\Theta_1$ and $\Theta_2$ are added, since they are composed in parallel (i.e., not in a sequence).

In summary, the generation of the composite model in 304 encompasses the repeated application of the following operations of two movement skills:
1) operation 1 (cascading movement skills in a sequence): if "movement skill #1" and "movement skill #2" are connected in a sequence (as represented in FIG. 4), calculating a composite movement skill model according to algorithm 1
2) operation 2 (combining movement skills in branches): if "movement skill #1" and "movement skill #2" are connected in parallel (as represented in FIG. 5), calculating the composite movement skill model according to algorithm 2.

These two operations are, in particular, repeatedly carried out as follows:
A) for each branch or subbranch within task diagram 303, recursively applying operation 1 in order to derive the composite movement skill for each branch.
B) for all parallel branches, recursively applying operation 2 in order to derive the composite movement skill for all branches. It should be noted that after A, each branch should include only one composite movement skill.
C) recursively applying A on all sequences of movement skills and of B on all branchings of movement skills.

When composite robot trajectory model 305 has been generated, the task for a given situation 306 (for example, initial configuration of the system, etc.) defined by sequence plan 303 may be executed.

For this purpose, the robot control unit considers the initial system configuration in given situation 306 and determines, for example, by applying equation (3) to composite robot trajectory model 305, the most probable sequence 307 of states (i.e., GMM components) within composite robot trajectory model 305, i.e., the state sequence, which brings the system (including the robot and the objects) with the highest probability into the target configuration.

The determination of state sequence 307 also provides the sequence of movement skills that have to be executed under given situation 306. This is significant if branchings in sequence plan 303 are present and the control unit must therefore select different branches.

From state sequence 307, the control unit ascertains robot movement trajectory 308 to be followed. It may, for example, use a linear quadratic tracking (LQT) in order to ascertain the optimal trajectory.

When control unit 106 controls robotic arm 101 according to robot movement trajectory 308, it installs, as indicated by arrow 309, the primitive actions, which are to be carried out in the process of controlling according to sequence plan 303.

For this purpose, when a primitive action according to a movement skill is to be carried out, the state in state sequence 307 is identified which is the end state of the movement skill, i.e., the end state of the robot trajectory model of the movement skill. If this state is reached, the control according to state sequence 307 is interrupted, the primitive action (or multiple primitive actions if multiple according to the movement skill are to be executed) is carried out and then the control according to the state sequence is resumed.

Figure 6:
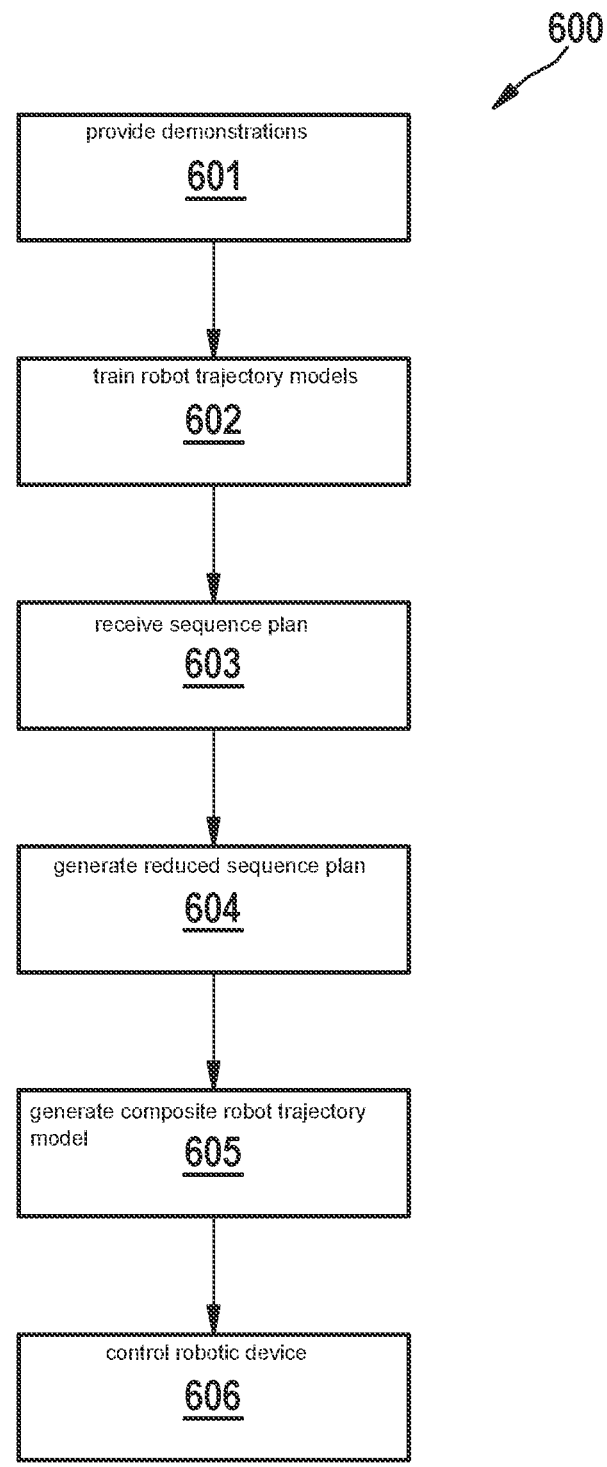
FIG. 6 shows a flowchart, which represents a method for controlling a robotic device according to one specific embodiment, in accordance with an example embodiment of the present invention.

In summary, a method according to various specific embodiments is provided, as represented in FIG. 6.

FIG. 6 shows a flowchart 600, which represents a method for controlling a robotic device according to one specific embodiment.

Demonstrations for carrying out each of multiple movement skills are provided in 601.

In 602, a robot trajectory model for each movement skill is trained from the demonstrations.

In 603, a sequence plan for a task to be carried out by the robotic device is received, the sequence plan including a sequence to be carried out made up of the movement skills and primitive actions.

In 604, a reduced sequence plan is generated from the sequence plan by omitting the primitive actions.

In 605, a composite robot trajectory model is generated from the robot trajectory models of the movement skills for the reduced sequence plan by, if two movement skills according to the reduced sequence plan are to be carried out in succession, cascading the robot trajectory models of the movement skills.

In 606, the robotic device is controlled according to the composite robot trajectory model, the control of the robot according to the composite robot trajectory model being interrupted after the implementation of the movement skill, if after one movement skill according to the sequence plan one or multiple primitive action(s) are to be executed before the next movement skill, and the one or multiple primitive action(s) are executed and the control of the robot according to the composite robot trajectory model is then resumed.

In other words, according to various specific embodiments, the movement skills are drawn from the sequence plan for a manipulation task, which is to be carried out by a robotic device, and for these a composite movement model is generated. The robotic device is then controlled based on the composite movement model, the actions being carried out at the correct points of the control.

The primitive actions may be understood to be basic actions, i.e., as action foundations, which the robotic device manages, i.e., for example, without these having to be learned from the demonstrations. There may, in particular, be actions, which do not need to be adapted to the respective control situation. Examples are the activation of the end effector (such as, for example, gripper open or gripper closed), the recognition of objects in the operating area of the robot or the changing of parameters of the robot control (for example, compliance). In addition, the primitive actions have the characteristic of not having to change the position and orientation of the end effector, so that the calculated robot trajectory subsequently continues to be valid and may be resumed.

According to various specific embodiments, models for a robotic device are trained for multiple movement skills, and when a task is to be executed which includes multiple executions of these movement skills in branches or in a sequence, the models are cascaded and/or combined to form a composite model. The composite model may then be used for controlling the robot as if it were a model for one single movement skill, i.e., for example, by determining an optimal state sequence for the task (and the initial configuration of the robotic device and objects, at which the task is to be executed) and by controlling the robotic device accordingly.

The method of FIG. 6 may be carried out by one or multiple computer(s) including one or multiple data processing unit(s). The term "data processing unit" may be understood to be any type of entity that enables the processing of data or signals. The data or signals may, for example, be handled according to at least one (i.e. one or more than one) specific function, which is carried out by the data processing unit. A data processing unit may include an analog circuit, a digital circuit, a composite signal circuit, a logic circuit, a microprocessor, a microcontroller, a central processing unit (CPU), a graphics processing unit (GPU), a digital signal processor (DSP), an integrated circuit of a programmable gate array (FPGA) or any combination thereof or formed therefrom. Any other way of implementing the respective functions, described in greater detail below, may also be understood to be a data processing unit or logic circuit arrangement. One or multiple of the method step(s) described here in detail may of course be executed (for example, implemented) by a data processing unit via one or multiple specific function(s), which are carried out by the data processing unit.

The term "robotic device" may be understood as relating to any physical system (including a mechanical part whose movement is controlled), such as, for example, a computer-controlled machine, a vehicle, a household appliance, a power tool, a manufacturing machine, a personal assistant or an access control system.

Various specific embodiments may receive and use sensor signals from various sensors such as, for example, video, radar, LIDAR, ultrasound, movement, heat imaging, etc., for example, in order to obtain sensor data with respect to demonstrations or states of the system (robotic device and object or objects) and configurations and scenarios. The sensor data may be processed. This may include the classification of the sensor data or carrying out a semantic segmentation on the sensor data, for example, in order to detect the presence of objects (in the surroundings in which the sensor data have been obtained). Specific embodiments may be used for training a machine learning system and for controlling a robotic device, for example, autonomously by robot manipulators, in order to achieve various manipulation tasks under different scenarios. Specific embodiments are applicable, in particular, to the control and supervision of the execution of manipulation tasks, for example, in assembly lines. They may, for example, be seamlessly integrated into a conventional GUI for a control process.

Although specific embodiments are represented and described here, those skilled in the art in the field will recognize that the specific embodiments shown and described may be exchanged for a variety of alternative and/or equivalent implementations, without departing from the scope of protection of the present invention. This application is intended to cover any adaptations or variations of the specific embodiments that are discussed herein.

What is claimed is:

1. A method for controlling a robotic device, comprising:
providing demonstrations for carrying out each of multiple movement skills;
training a respective robot trajectory model for each movement skill from the demonstrations;
receiving a sequence plan for one of the tasks to be carried out by the robot, the sequence plan including a sequence made up of the movement skills and primitive actions;
ascertaining a reduced sequence plan from the sequence plan by omitting the primitive actions;
generating a composite robot trajectory model from two of the respective robot trajectory models of two of the movement skills for the reduced sequence plan by, when two of the movement skills according to the reduced sequence plan are to be carried out in succession, cascading the two of the robot trajectory models of the two of the movement skills; and
controlling the robot according to the composite robot trajectory model, wherein when, after one movement skill according to the sequence plan, one or multiple primitive actions is executed before a next movement skill, the control of the robot according to the composite robot trajectory model is interrupted after carrying out one movement skill, and the one or multiple primitive actions is executed and the control of the robot according to the composite robot trajectory model is then resumed.

2. The method as recited in claim 1, wherein, when according to the sequence plan one or multiple primitive actions are to be executed after one movement skill, a state in the composite robot trajectory model, which is an end state of the robot trajectory model of the movement skill, is identified, the control of the robot according to the composite robot trajectory model is interrupted when the state in the composite robot trajectory model has been achieved during the control of the robot, the one or multiple primitive actions are executed, and the control of the robot according to the composite robot trajectory model is then resumed.

3. The method as recited in claim 1, wherein for each movement skill of the robot trajectory model is a hidden semi-Markov model including one or multiple initial states and one or multiple end states, and the method further comprising training a precondition model for each movement skill based on the demonstrations, which includes for each initial state of the robot trajectory model of the movement skill a probability distribution of robot configurations before the execution of the movement skill and of an end condition model for each movement skill, which includes for each end state of the robot trajectory model of the movement skill a probability distribution of robot configurations after the execution of the movement skill and the composite robot trajectory model being generated;
wherein when two movement skills according to the reduced sequence plan are to be carried out in one sequence, cascading the robot trajectory models of the movement skills by:
incorporating the initial and end states of the trajectory models of the two movement skills into the composite robot trajectory model, and
calculating a transition probability between each end state of the trajectory model of a first movement skill of the two movement skills and each initial state of the trajectory model of the second movement skill of the two movement skills as a function of the similarity between the probability distribution of the end condition model of the first movement skill for the first state of the first movement skill and the probability distribution of the initial model of the second movement skill for the initial state for the second movement skill; and
wherein when two movement skills according to the sequence plan are to be carried out alternatively to one another, combining the robot trajectory models of the movement skills by incorporating the initial and end states of the trajectory models of the two movement skills into the composite robot trajectory model, and setting the transition probability between states of the first movement skill and states of the second movement skill to zero.

4. The method as recited in claim 3, wherein each movement skill includes a manipulation of one or of multiple objects by the robot and the hidden semi-Markov model of each movement skill is a task-parameterized hidden semi-Markov model including task parameters, which correspond to the robot and object configuration, in which the movement skill is applied.

5. The method as recited in claim 4, further comprising training an effect model for each movement skill, which includes for each end state of the robot trajectory model of the movement skill a probability distribution of how the robot configuration and/or object configuration is changed relative to an initial robot configuration and/or object configuration after execution of the movement skill, to which the movement skill is applied, the cascading of the robot trajectory model of the movement skill including transformation of the task-parameterized hidden semi-Markov model of the second movement skill when two movement skills are to be carried out in one sequence in the task, so that its task parameters are task parameters that correspond to the robot configuration and/or object configuration, which is provided by the effect model of the first movement skill.

6. The method as recited in claim 1, wherein the generation of the composite robot trajectory model includes a repeated cascading of the robot trajectory models, cascaded robot trajectory models and combined robot trajectory models and combining of the robot trajectory models, cascaded robot trajectory models and a combined robot trajectory according to the task, so that the composite robot trajectory model is a trajectory model for the entire task.

7. A robot control unit configured to control a robotic device, the robot control unit configured to:
provide demonstrations for carrying out each of multiple movement skills;
train a respective robot trajectory model for each movement skill from the demonstrations;
receive a sequence plan for one of the tasks to be carried out by the robot, the sequence plan including a sequence made up of the movement skills and primitive actions;
ascertain a reduced sequence plan from the sequence plan by omitting the primitive actions;
generate a composite robot trajectory model from two of the respective robot trajectory models of two of the movement skills for the reduced sequence plan by, when two of the movement skills according to the reduced sequence plan are to be carried out in succession, cascading the two of the robot trajectory models of the two of the movement skills; and
control the robot according to the composite robot trajectory model, wherein when, after one movement skill according to the sequence plan, one or multiple primitive actions is executed before a next movement skill, the control of the robot according to the composite robot trajectory model is interrupted after carrying out one movement skill, and the one or multiple primitive actions is executed and the control of the robot according to the composite robot trajectory model is then resumed.

8. A non-transitory computer-readable medium on which is stored commands for controlling a robotic device, the commands, when executed by a processor, causing the processor to perform the following steps:
providing demonstrations for carrying out each of multiple movement skills;
training a respective robot trajectory model for each movement skill from the demonstrations;
receiving a sequence plan for one of the tasks to be carried out by the robot, the sequence plan including a sequence made up of the movement skills and primitive actions;
ascertaining a reduced sequence plan from the sequence plan by omitting the primitive actions;
generating a composite robot trajectory model from two of the respective robot trajectory models of two of the movement skills for the reduced sequence plan by, when two of the movement skills according to the reduced sequence plan are to be carried out in succession, cascading the two of the robot trajectory models of the two of the movement skills; and
controlling the robot according to the composite robot trajectory model, wherein when, after one movement skill according to the sequence plan, one or multiple primitive actions is executed before a next movement skill, the control of the robot according to the composite robot trajectory model is interrupted after carrying out one movement skill, and the one or multiple primitive actions is executed and the control of the robot according to the composite robot trajectory model is then resumed.

* * * * *